US011907101B2

(12) United States Patent
Seletskiy et al.

(10) Patent No.: US 11,907,101 B2
(45) Date of Patent: Feb. 20, 2024

(54) SYSTEMS AND METHODS FOR SELECTIVE PATCHING BASED ON KERNEL AND USER SPACE INTERACTION

(71) Applicant: Cloud Linux Software, Inc., Estero, FL (US)

(72) Inventors: Igor Seletskiy, Estero, FL (US); Pavel Boldin, Kharkov (UA)

(73) Assignee: Cloud Linux Software, Inc., Estero, FL (US)

( * ) Notice: Subject to any disclaimer, the term of this patent is extended or adjusted under 35 U.S.C. 154(b) by 152 days.

(21) Appl. No.: 17/677,644

(22) Filed: Feb. 22, 2022

(65) Prior Publication Data

US 2023/0267068 A1    Aug. 24, 2023

(51) Int. Cl.
*G06F 11/36* (2006.01)
*G06F 8/658* (2018.01)
*G06F 12/1009* (2016.01)

(52) U.S. Cl.
CPC .......... *G06F 11/3636* (2013.01); *G06F 8/658* (2018.02); *G06F 11/3624* (2013.01); *G06F 12/1009* (2013.01)

(58) Field of Classification Search
None
See application file for complete search history.

(56) References Cited

U.S. PATENT DOCUMENTS

| | | | | |
|---|---|---|---|---|
| 5,991,856 A * | 11/1999 | Spilo | ............... | G06F 11/0793 711/147 |
| 6,622,300 B1 * | 9/2003 | Krishnaswamy | ... | G06F 9/45525 717/130 |
| 6,802,068 B1 * | 10/2004 | Guruprasad | ............ | H04L 67/14 709/227 |
| 2006/0200863 A1 * | 9/2006 | Ray | ........................ | G06F 12/145 711/E12.102 |
| 2009/0055693 A1 * | 2/2009 | Budko | ................. | G06F 9/45558 718/1 |
| 2010/0031360 A1 * | 2/2010 | Seshadri | .................. | G06F 21/74 726/28 |
| 2010/0333090 A1 * | 12/2010 | Wright | ................ | G06F 9/45516 718/1 |

(Continued)

OTHER PUBLICATIONS

B. Shi, B. Li, L. Cui and L. Ouyang, "Vanguard: A Cache-Level Sensitive File Integrity Monitoring System in Virtual Machine Environment," in IEEE Access, vol. 6, pp. 38567-38577, 2018, doi: 10.1109/ACCESS.2018.2851192. (Year: 2018).*

*Primary Examiner* — Andrew M. Lyons
(74) *Attorney, Agent, or Firm* — ArentFox Schiff LLP; Michael Fainberg (57) ABSTRACT

Disclosed herein are systems and methods for selective patching processes. In one exemplary aspect, the method includes: identifying, via a user space patching service, a patch that modifies at least one function included in a process, wherein the process is executed on a computing device; generating a list of target pages in virtual memory of the computing device, wherein the list of target pages includes code associated with the at least one function; marking the target pages as non-executable based on file identification; intercepting, using an amended page-fault event handler, an attempt to execute the code associated with the at least one function by the process; and applying the patch to modify the at least one function.

17 Claims, 5 Drawing Sheets

(56) References Cited

U.S. PATENT DOCUMENTS

| | | | |
|---|---|---|---|
| 2011/0219447 A1* | 9/2011 | Horovitz | G06F 21/566 |
| | | | 726/22 |
| 2013/0086299 A1* | 4/2013 | Epstein | G06F 9/44563 |
| | | | 711/6 |
| 2017/0168955 A1* | 6/2017 | Boehm | G06F 11/0709 |
| 2018/0307516 A1* | 10/2018 | Dabak | G06F 8/65 |

* cited by examiner

SYSTEMS AND METHODS FOR SELECTIVE PATCHING BASED ON KERNEL AND USER SPACE INTERACTION

FIELD OF TECHNOLOGY

The present disclosure relates to the field of software updates, and, more specifically, to systems and methods for selective patching based on kernel and user space interaction.

BACKGROUND

The amount of user space software applications on modern computers is increasing as the hardware capabilities of said computers expand. Because modern computers are now able to handle greater processing loads and have more memory than before, several user space applications may be installed and may run simultaneously on a given computer. It is common for user space applications, however, to have bugs and performance issues and developers rely on software patches to cure those deficiencies.

In conventional patching, vulnerable functions in user space applications are patched regardless of whether the code will be executed. While some applications or features of an application may be used on a regular basis by a user, other applications or features of an application are rarely used. Thus, not all objects need to be patched at a given time. Applying patches to all objects may require significantly high processing loads depending on the number of objects and expends resources that can be used for other computer functionality.

Thus, there is a need for a more efficient patching system.

SUMMARY

To address these shortcomings, aspects of the disclosure describe methods and systems for selective patching based on kernel and user space interaction.

In one exemplary aspect, the techniques described herein relate to a method for selective patching processes, the method including: identifying, via a user space patching service, a patch that modifies at least one function included in a process, wherein the process is executed on a computing device; generating a list of target pages in virtual memory of the computing device, wherein the list of target pages includes code associated with the at least one function; marking the target pages as non-executable based on file identification; intercepting, using an amended page-fault event handler, an attempt to execute the code associated with the at least one function by the process; and applying the patch to modify the at least one function.

In some aspects, the techniques described herein relate to a method, wherein intercepting the attempt to execute the code includes detecting a page fault in at least one of the target pages marked as non-executable.

In some aspects, the techniques described herein relate to a method, further including stopping the process prior to execution of the code.

In some aspects, the techniques described herein relate to a method, wherein marking the target pages as non-executable is performed by a kernel of the computing device, wherein the user space patching service configures the kernel to mark pages in the virtual memory mapped to an executable object comprising the at least one function.

In some aspects, the techniques described herein relate to a method, wherein mappings between the pages in the virtual memory and an executable object comprising the at least one function is generated based on a dev/inode pair.

In some aspects, the techniques described herein relate to a method, wherein mappings between the pages in the virtual memory and an executable object comprising the at least one function is generated using a unique build identifier of the at least one function.

In some aspects, the techniques described herein relate to a method, further including: identifying another patch that modifies at least one other function included in a process; marking another set of target pages associated with the at least one other function as non-executable based on file identification; and not applying the another patch to modify the at least one other function until a page fault is detected in the another set of target pages.

In some aspects, the techniques described herein relate to a method, further including executing the code subsequent to applying the patch.

It should be noted that the methods described above may be implemented in a system comprising a hardware processor. Alternatively, the methods may be implemented using computer executable instructions of a non-transitory computer readable medium.

In some aspects, the techniques described herein relate to a system for selective patching processes, the system including: a hardware processor configured to: identify, via a user space patching service, a patch that modifies at least one function included in a process, wherein the process is executed on a computing device; generate a list of target pages in virtual memory of the computing device, wherein the list of target pages includes code associated with the at least one function; mark the target pages as non-executable based on file identification; intercept, using an amended page-fault event handler, an attempt to execute the code associated with the at least one function by the process; and apply the patch to modify the at least one function.

In some aspects, the techniques described herein relate to a non-transitory computer readable medium storing thereon computer executable instructions for selective patching processes, including instructions for: identifying, via a user space patching service, a patch that modifies at least one function included in a process, wherein the process is executed on a computing device; generating a list of target pages in virtual memory of the computing device, wherein the list of target pages includes code associated with the at least one function; marking the target pages as non-executable based on file identification; intercepting, using an amended page-fault event handler, an attempt to execute the code associated with the at least one function by the process; and applying the patch to modify the at least one function.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for selective patching based on kernel and user space interaction. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The present disclosure describes a selective approach to patching based on the interaction between a kernel and a user space. The proposed systems and methods prioritize patching objects on processes where vulnerable code is executed over processes that will not be used for the time being and/or have no known vulnerability. In the context of the present disclosure, vulnerable code refers to a function that needs to be patched due to a performance or security issue.

Figure 1:
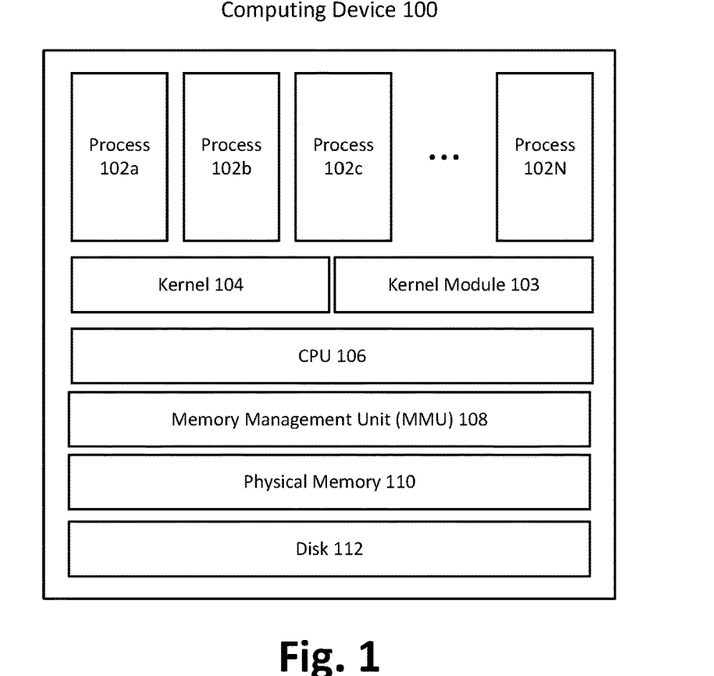
FIG. 1 is a block diagram illustrating a computing device with processes that include functions that need to be patched.

FIG. 1 is a block diagram illustrating computing device 100 with processes 102 that include functions that need to be patched. Computing device 100 includes processes 102a-102N. Computing device 100 includes a central processing unit (CPU) 106 that executes processes 102 in the user space. Kernel 104, which is the main component of the operating system, keeps a track of memory usage, determines which of processes 102 can use CPU 106, manages interactions between the hardware of computing device 100 and processes 102, and receives requests for services from processes 102 (i.e., system calls). Computing device 100 also includes disk 112 (e.g., a hard drive), physical memory 110 (e.g., random access memory (RAM)), and memory management unit (MMU) 108.

Figure 2:
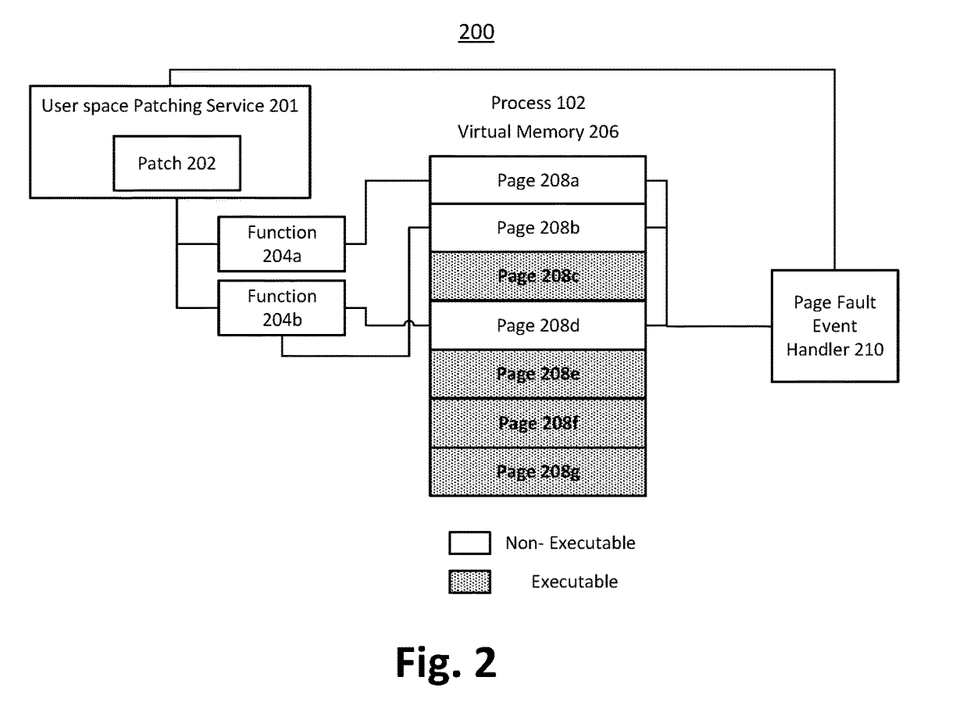
FIG. 2 is a block diagram illustrating a system for selective patching based on kernel and user space interaction.

FIG. 2 is a block diagram illustrating system 200 for selective patching based on kernel and user space interaction. Modern computer architectures use a paging address mode that allows for the abstraction of virtual memory (VM), where every process thinks of the whole address space as its own. The address space in this mode is divided into pages, where every VM page may have a corresponding physical memory (PM) page. During access to the virtual memory, a memory management unit (MMU) 108 uses a paging structure built by the operating system (OS) to resolve a VM address to a PM address, check access rights, and store the result to translation look-ahead buffer (TLB) cache.

A paging structure may be a radix tree keyed by the page number, which is highest part of address bits. Access rights are controlled by architecture-specific bits in the leafs of the paging structure. These access rights usually consist of READ, WRITE and EXEC flags among others, allowing the code to, correspondingly, read the page, write to it, or execute the code stored there.

During inappropriate memory access, CPU 106 generates a page-fault (PF) event that is handled by kernel 104. A page-fault handler checks what memory address was accessed and decides further actions depending on the memory mapping of the process. The OS can, for example, load the page from disk 112 (for a swap or lazy loading), allocate a real physical page (for lazy allocation), or kill the application (for incorrect access).

User space patching service 201 (e.g., executing LibCare) builds patches by comparing the intermediate assembly files between the original and modified code. When a difference between the assembly files is detected, the new code and data are put into a separate set of sections. After the resulting binary is linked, the patch-related sections are extracted along with the auxiliary information required for patching the application and stored into a binary patch 202.

During the patching of the application, every process 102 is examined to learn which executable objects the process has loaded in its memory. If there are binary patches for any of the objects used by process, the process is stopped. Patches are mapped into the process memory and original code is amended to unconditionally transfer execution path to the patched code.

In an exemplary aspect, during the building of patch 202, service 201 compiles a list of all target functions. This list is combined into a list of pages of the target library that must be marked as "non-executable" later. For example, in FIG. 2, patch 202 targets functions 204a and 204b of one or more processes (e.g., process 102a, process 102N, etc.).

User space patching service 201 then instructs kernel 104 to mark the appropriate pages on all loaded instances of the executable object as "non-executable." An executable object is a shared library or an executable file (e.g., an application). The executable object has a set of functions loaded with executable rights. In some cases, there may be more than one executable object for a given application because of the shared libraries. Thus, when a page fault is hit, kernel module 103 must decide which object tried to execute the code marked as non-executable because the original code here has vulnerabilities. More specifically, kernel module 103 consults the list of pages for the given executable object (e.g., shared library or executable) and determines if the added mark was the reason for the page fault. If it was, kernel module 103 may, for example, stop the target application and notify the userspace service about this hit.

For example, in FIG. 2, function 204a corresponds to page 208a and function 204b corresponds to pages 208b and pages 208d. The identification of the executable object may be done via a dev/inode pair or using a unique build ID present in most objects (e.g. glibc shared library resides on dev 0x101 and has inode number 4242 with build ID a6cb40078351e05121d46daa768e271846d5cc54). In some aspects, ioctl or procfs interfaces might be used for communication between user space patch service 201 and kernel module 103 (e.g. a/proc/kcare/patch-list file might accept a list of formatted entries "dev inode buildid page-offset" handled by kernel 104 code).

Kernel 104 goes through the target process memory 206 and changes access rights for the marked pages (e.g., pages 208a, 208b, 208d) of the files so that when the executable object tries to execute code from these pages, the object hits a page fault. This page fault is then handled by kernel module 103. Due to the fact that until copy-on-write is done, all the mmaped instances of a file share the same physical memory (and paging-structure components), the change in access rights will only need to be done once.

During access to code associated with function 204a or function 204b (in pages 208a, 208b, 208d), a page-fault is generated and information about the page-fault is transferred to the user space patching service 201. In some aspects, user space patching service 201 may issue a kernel patch or a kernel module 103 to amend page-fault event handler 210 in kernel 104. In some aspects, kernel module 103 may install itself as a kprobe to intercept the page-fault. In other aspects, kernel module 103 may redirect page-fault event handler 210 to itself. In the case of a kernel patch, the kernel patch will simply change the code flow in page-fault event handler 210.

Page-fault event handler 210 may check if the page fault event comes from access to a page previously marked as non-executable by kernel 104 described above. If that is the case, handler 210 may notify user space patching service 201 (e.g., via netlink protocol). Patch 202 may then be applied (selectively) to the code being accessed. In some aspects, the amended page-fault event handler 210 stops the process first to make sure that no vulnerable code is being executed.

Figure 3A:
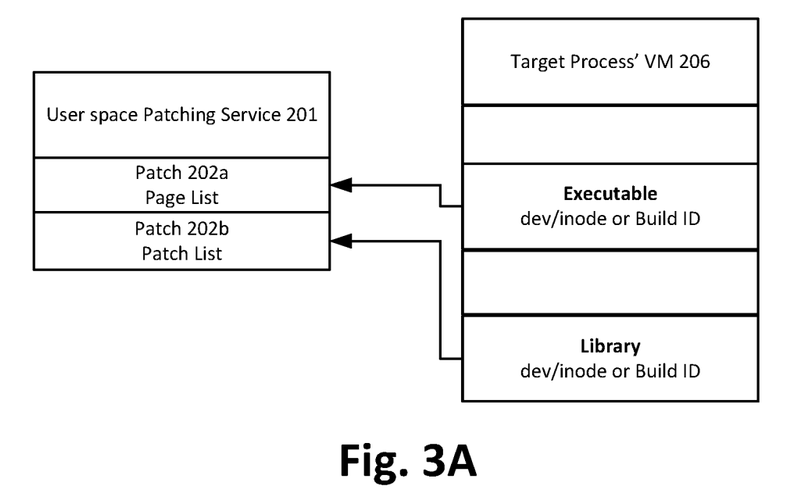
FIG. 3a illustrates a block diagram for compiling a list of pages to be passed to a kernel module.

FIGS. 3a, 3b, 3c, and 3d elaborate further on each of the steps described in FIG. 2. FIG. 3a illustrates block diagram 300 for compiling a list of pages to be passed to kernel module 103. User space patching service 201 reads memory mapping information and the memory of the target process' VM 206. Service 201 then finds which patches are applicable for the objects loaded by process 102 (e.g., objects identified by either dev/inode found in memory mapping information or Build ID found in the loaded object module). Service 201 then compiles a list of pages to be passed to kernel module 103 for marking.

Figure 3B:
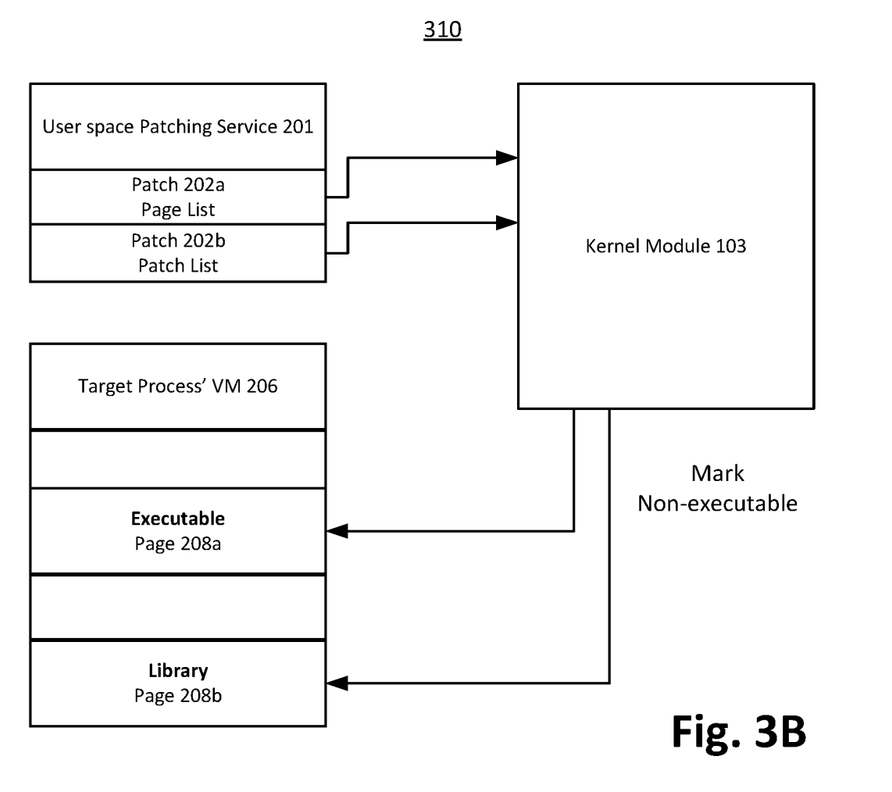
FIG. 3b illustrates a block diagram for marking pages as non-executable.

FIG. 3b illustrates block diagram 310 for marking pages as non-executable. Diagram 310 specifically shows the operation of kernel module 103 on target process' VM 206. Service 201 passes the list of pages (e.g., patch 202a page list and patch 202b page list) to kernel module 103. For example, the list of pages may include page 208a, which corresponds to the executable, and page 208b, which corresponds to the library. Kernel module 103 then marks the pages of process' VM 206 provided by service 201 as "non-executable." In some aspects, module 103 also installs modified page fault event handler 210.

Figure 3C:
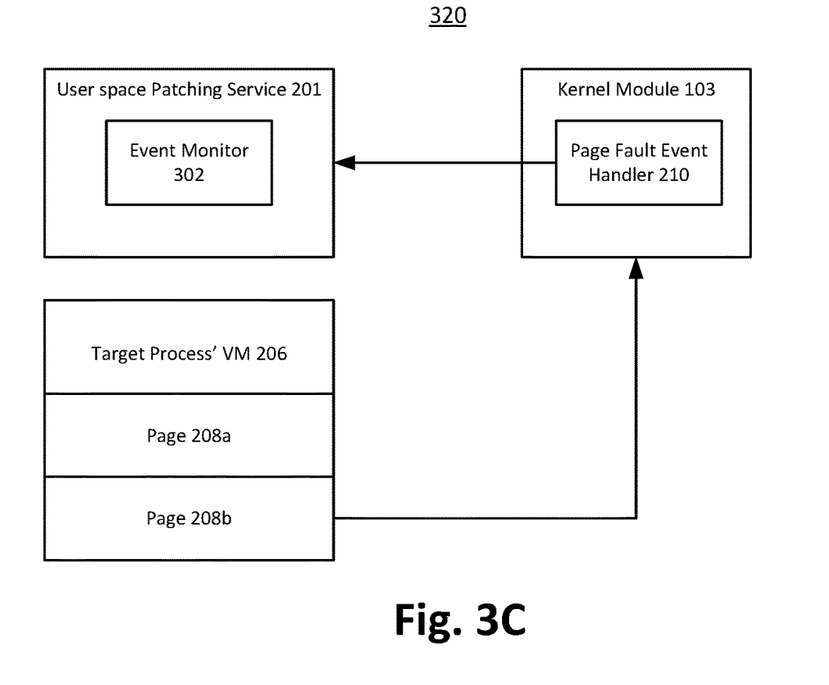
FIG. 3c illustrates a block diagram for detecting a page fault event.

FIG. 3c illustrates block diagram 320 for detecting a page fault event. Diagram 320 depicts the event of a page fault occurring on page 208b marked by kernel module 103. This page fault happens because process 206 tries to execute page 208b of a library that was marked non-executable. On this event, module 103 notifies event monitor 302 of service 201. Optionally, module 103 also stops the execution of process 206.

Figure 3D:
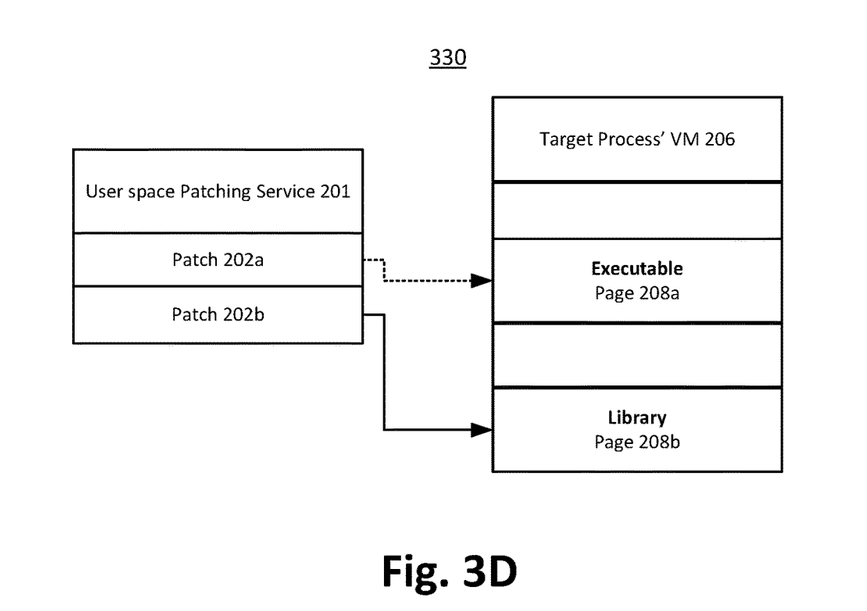
FIG. 3d illustrates a block diagram for applying a patch.

FIG. 3d illustrates block diagram 330 for applying a patch. When service 201 receives a message from kernel module 103, service 201 applies patch 202b to the library associated with page 208b (i.e., the library that has tried to execute non-secure code). It should be noted that because a page fault has not been detected for page 208a, service 201 does not apply patch 202a to the executable object associated with page 208a.

Figure 4:
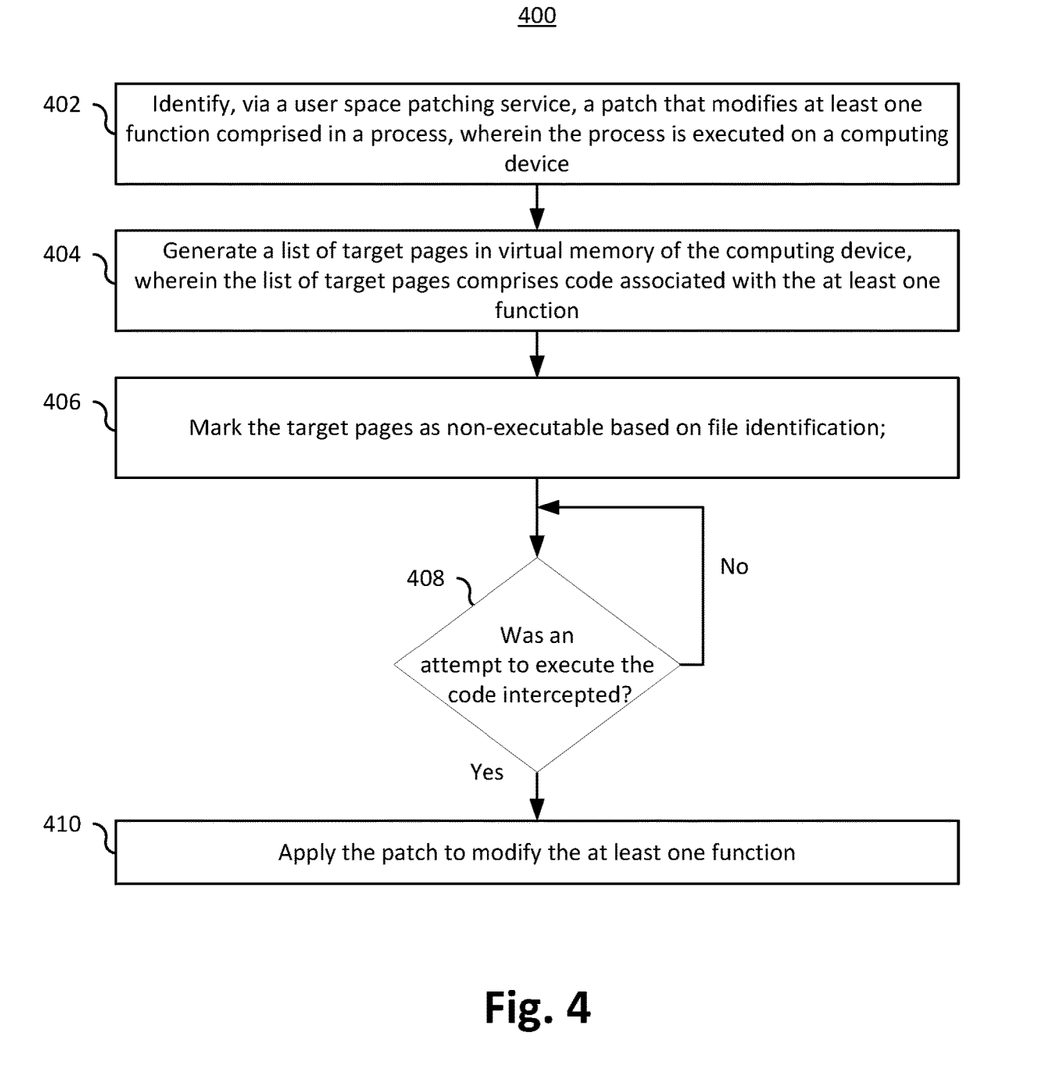
FIG. 4 is a flow diagram illustrating a method for selective patching based on kernel and user space interaction.

FIG. 4 is a flow diagram illustrating method 400 for selective patching based on kernel and user space interaction.

At 402, service 201 identifies a patch that modifies at least one function (e.g., function 204a) comprised in a process (e.g., process 102) executing on a computing device (e.g., device 100). In some aspects, identification of the executable object associated with the process is performed using a dev/inode pair or a unique build identifier of the executable object comprising the at least one function. In some aspects, the target pages are indicated in the patch.

At 404, service 201 generates a list of target pages (e.g., page 208a, 208b, etc.) in virtual memory (e.g., VM 206) of the computing device, wherein the list of target pages comprises code associated with the at least one function.

At 406, kernel 104 marks the target pages as non-executable based on file identification (e.g., dev/inode, build identifier, etc.). In some aspects, user space patching service 201 configures kernel 104 to mark pages in the virtual memory mapped to the at least one function.

At 408, service 201 determines whether an attempt to execute the code was intercepted. For example, an amended page-fault event handler (e.g., handler 210) may intercept the attempt to execute the code associated with the at least one function by the process and inform service 201. Kernel 104 may detect a page fault event and page-fault event handler 210 may check if the page fault event comes from access to a page previously marked as non-executable by kernel 104. If so, the page fault event is indicative of an attempt to execute the code and method 400 advances to 410. Otherwise, method 400 returns to 408 as service 201 determines whether an interception of an attempt (i.e., a page fault event of a previously marked page) has occurred. It should be noted if handler 210 determines that the page fault event is not related to the marked non-executable pages, method 400 does not advance to 410.

At 410, service 201 applies the patch to modify the at least one function. In some aspects, handler 210 stops the process prior to execution of the code to prevent execution of vulnerable code. In some aspects, handler 210 executes the code subsequent to applying the patch.

In some aspects, service 201 may identify another patch that modifies at least one other function comprised in the process, and may instruct the marking of another set of target pages associated with the at least one other function as non-executable based on file identification. Service 201 may not apply the another patch to modify the at least one other function until a page fault is detected in the another set of target pages.

Figure 5:
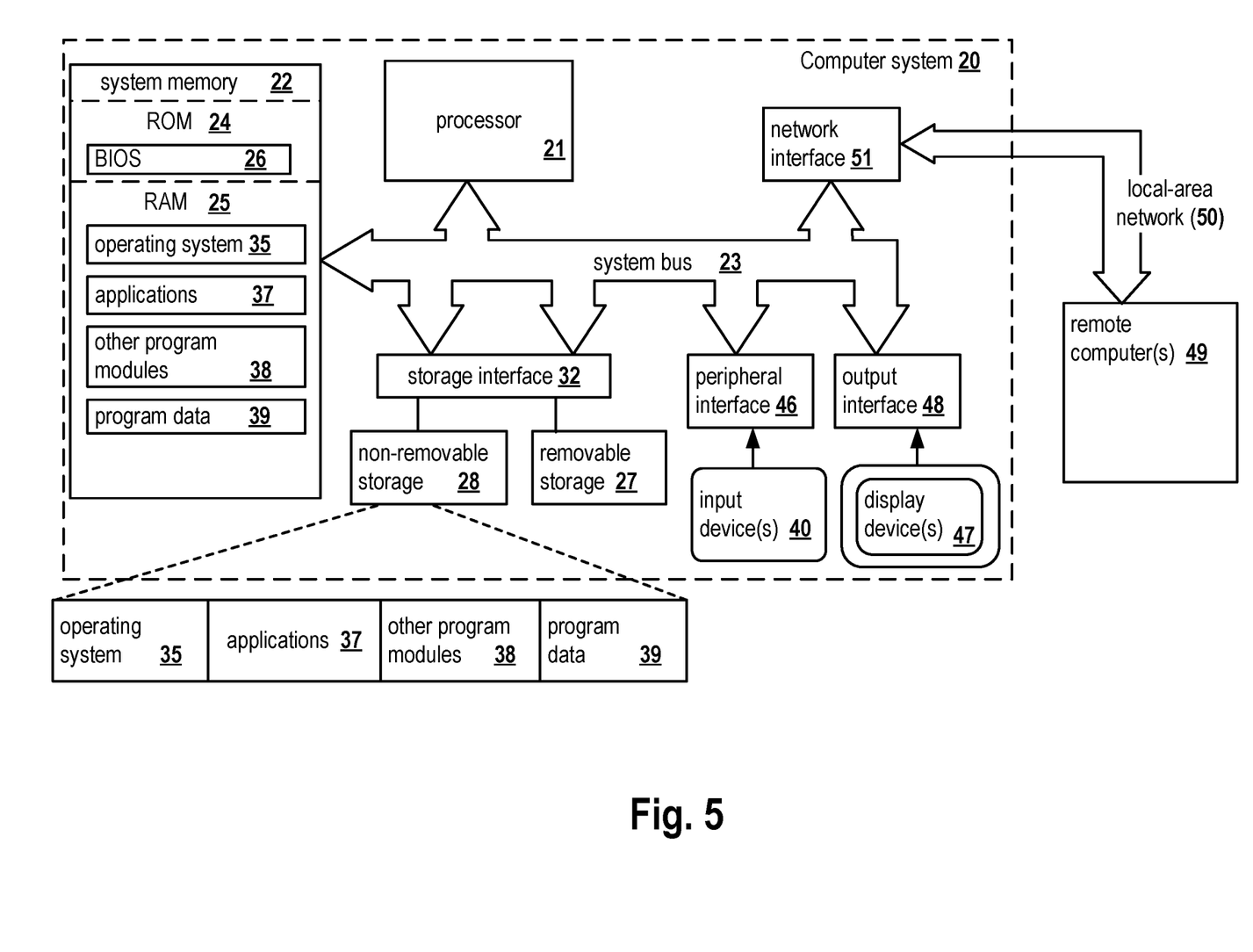
FIG. 5 presents an example of a general-purpose computer system on which aspects of the present disclosure can be implemented.

FIG. 5 is a block diagram illustrating a computer system 20 on which aspects of systems and methods for selective patching based on kernel and user space interaction may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-4 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for selective patching processes, the method comprising:
identifying, via a user space patching service, a patch that modifies at least one function comprised in a process, wherein the process is executed on a computing device;
generating a list of target pages in virtual memory of the computing device, wherein the list of target pages comprises code associated with the at least one function;
marking the target pages as non-executable based on file identification; and
in response to intercepting, using an amended page-fault event handler, an attempt to execute the code associated with the at least one function by the process; applying the patch to modify the at least one function.

2. The method of claim 1, wherein intercepting the attempt to execute the code comprises detecting a page fault in at least one of the target pages marked as non-executable.

3. The method of claim 1, further comprising stopping the process prior to execution of the code.

4. The method of claim 1, wherein marking the target pages as non-executable is performed by a kernel of the computing device, wherein the user space patching service configures the kernel to mark pages in the virtual memory mapped to an executable object comprising the at least one function.

5. The method of claim 4, wherein mappings between the pages in the virtual memory and the executable object comprising the at least one function is generated based on a dev/inode pair.

6. The method of claim 4, wherein mappings between the pages in the virtual memory and the executable object comprising the at least one function is generated using a unique build identifier of the at least one function.

7. The method of claim 1, further comprising:
identifying another patch that modifies at least one other function comprised in the process;
marking another set of target pages associated with the at least one other function as non-executable based on file identification; and
not applying the another patch to modify the at least one other function until a page fault is detected in the another set of target pages.

8. The method of claim 1, further comprising executing the code subsequent to applying the patch.

9. A system for selective patching processes, the system comprising:
a hardware processor configured to:
identify, via a user space patching service, a patch that modifies at least one function comprised in a process, wherein the process is executed on a computing device;
generate a list of target pages in virtual memory of the computing device, wherein the list of target pages comprises code associated with the at least one function;
mark the target pages as non-executable based on file identification; and
in response to intercepting, using an amended page-fault event handler, an attempt to execute the code associated with the at least one function by the process, apply the patch to modify the at least one function.

10. The system of claim 9, wherein the hardware processor is further configured to intercept the attempt to execute the code by detecting a page fault in at least one of the target pages marked as non-executable.

11. The system of claim 9, wherein the hardware processor is further configured to stop the process prior to execution of the code.

12. The system of claim 9, wherein marking the target pages as non-executable is performed by a kernel of the computing device, wherein the user space patching service configures the kernel to mark pages in the virtual memory mapped to an executable object comprising the at least one function.

13. The system of claim 12, wherein mappings between the pages in the virtual memory and the executable object comprising the at least one function is generated based on a dev/inode pair.

14. The system of claim 12, wherein mappings between the pages in the virtual memory and the executable object comprising the at least one function is generated using a unique build identifier of the at least one function.

15. The system of claim 9, wherein the hardware processor is further configured to:
  identify another patch that modifies at least one other function comprised in the process;
  marking another set of target pages associated with the at least one other function as non-executable based on file identification; and
  not applying the another patch to modify the at least one other function until a page fault is detected in the another set of target pages.

16. The system of claim 9, wherein the hardware processor is further configured to execute the code subsequent to applying the patch.

17. A non-transitory computer readable medium storing thereon computer executable instructions for selective patching processes, including instructions for:
  identifying, via a user space patching service, a patch that modifies at least one function comprised in a process, wherein the process is executed on a computing device;
  generating a list of target pages in virtual memory of the computing device, wherein the list of target pages comprises code associated with the at least one function;
  marking the target pages as non-executable based on file identification; and
  in response to intercepting, using an amended page-fault event handler, an attempt to execute the code associated with the at least one function by the process, applying the patch to modify the at least one function.

* * * * *